April 7, 1953     D. B. CRUIKSHANK     2,634,306
METHOD OF BATTERY MANUFACTURE
Filed April 26, 1950
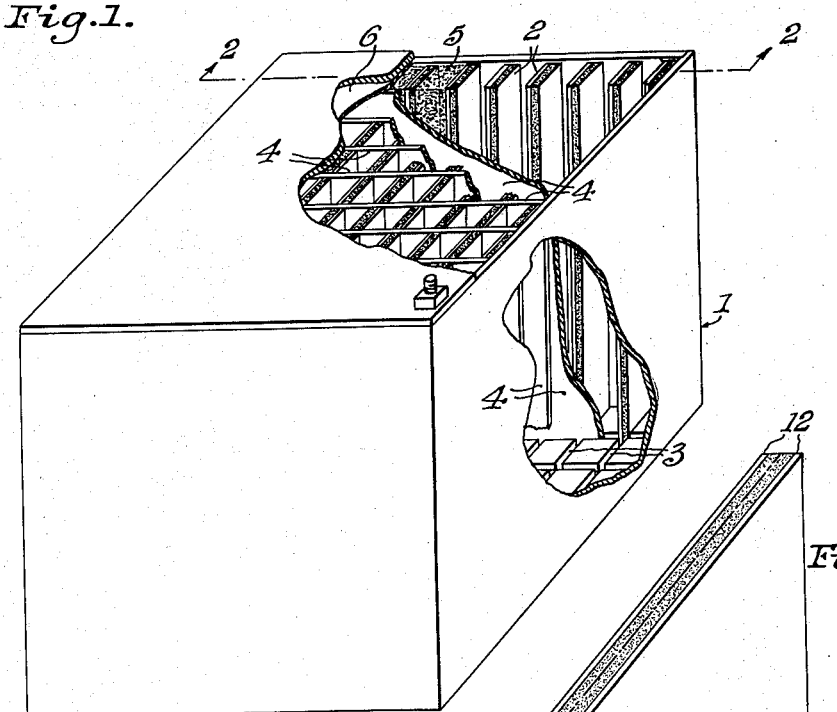
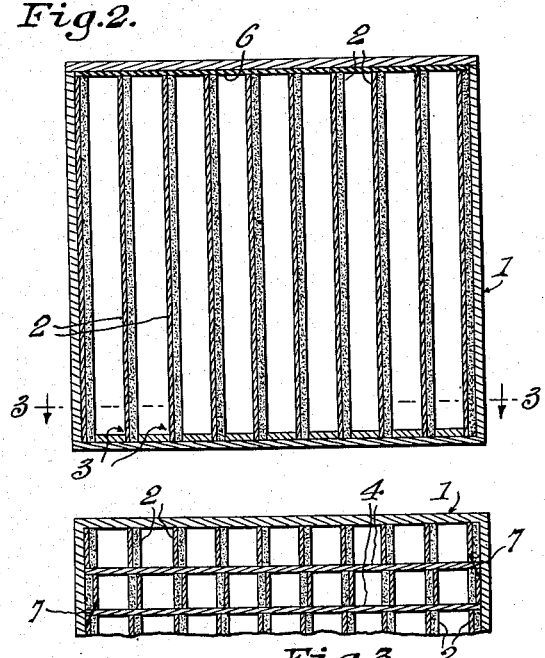
INVENTOR.
Douglas B. Cruikshank
BY
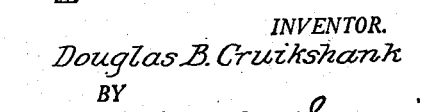
ATTORNEY Patented Apr. 7, 1953

2,634,306

UNITED STATES PATENT OFFICE 2,634,306

METHOD OF BATTERY MANUFACTURE

Douglas B. Cruikshank, Alexandria, Va.

Application April 26, 1950, Serial No. 158,317

3 Claims. (Cl. 136—121)

(Granted under Title 35, U. S. Code (1952), sec. 266)

The invention described herein may be manufactured and used by or for the Government for governmental purposes, without the payment to me of any royalty thereon.

This invention relates to the construction of miniature flat-pack batteries and the manufacture of the duplex plates therefor.

The need for miniature batteries capable of high voltage and long life is widespread. In the past, small individual cylindrical cells have been placed in one container and connected together by external conductors. A type of battery known as the flat-pack battery was developed to do away with the necessity of such external connections and provide a more compact battery. The present invention is directed toward improvements in such batteries and their manufacture.

An object of the invention is to provide an improved high voltage miniature battery.

Another object of the invention is to provide an improved flat-pack primary battery.

Another object of the invention is to provide an improved high voltage flat-pack battery utilizing duplex plates.

A still further object of the invention is to provide an improved flat-pack miniature battery including duplex plates of zinc and carbon manufactured by a new process.

A further object of the invention is to provide a new method of manufacturing duplex battery plates for use in miniature flat-pack batteries.

A still further object of the invention is to provide a new method of manufacturing duplex battery plates of carbon and zinc composition by splitting in two a carbon plate coated on two opposite faces with layers of zinc.

Another object of the invention is to provide a new method of manufacturing duplex battery plates of carbon and zinc composition wherein two carbon plates are bonded together and plated on opposite sides. Following this, the bond between the plates is broken.

Other objects and advantages of this invention will be more apparent when the following description is read in connection with the accompanying drawings in which:

Fig. 1 is an isometric view of the improved battery, with a portion cut away to illustrate internal constructions including the cells and separators, Fig. 2 is a vertical section of the battery on the line 2—2 of Fig. 1, Fig. 3 is a partial bottom section of the battery taken on the line 3—3 of Fig. 2, Fig. 4 is an isometric view of the carbon and zinc plate during an intermediate step in the manufacture of the battery plate, and Fig. 5 is an isometric view of the finished duplex battery plate made in accordance with my invention.

The improved miniature battery generates a voltage by means of the well-known carbon-zinc dry cell action when a suitable electrolyte and depolarizer is placed between the duplex battery plates. Due to the new method of making the plates, described more fully below, the battery can be easily and inexpensively constructed, and will be small, light and rugged, yet capable of high voltage and relatively long life.

Referring now to the drawings, Figs. 1 and 2 show the internal construction of the battery. Reference numeral 1 indicates a conventional battery container formed of heavily waxed cardboard. A heavy wax coating on the floor of the container 1 has grooves 3 formed to receive the plates 2 and prevent leakage between cells. Separators 4 may be heavily waxed cardboard pressed tightly against the plates 2. Any suitable electrolyte such as ammonium chloride may be used in the battery. Either manganese dioxide or activated carbon may be used as a depolarizer, although the latter is preferable. The electrolyte and depolarizer 5 are placed between the plates. This mixture may be made up in cakes to insert between the plates or inserted in any other convenient manner. A layer of tar or wax 6 may be spread over the top of the cells within the container 1.

In Fig. 3, a partial cutaway view of the bottom of the battery illustrates one manner utilized for joining the end plates to provide a series relation of the cells in adjacent rows. The end plates may be connected by busses 7 or other suitable means.

Figs. 4 and 5 illustrate the battery plates 2 in different stages of manufacture. Fig. 4 shows a carbon plate 11, formed preferably, but not necessarily, of pressed carbon, coated on both sides with layers of zinc 12. Instead of being a unitary structure, the carbon plate 11 may be formed of two separate sections bonded together by any suitable means such as glue or wax. It is noted that this product of itself has utility since in some instances it would be advantageous to vend it and later split and cut the resulting plates to size. These instances might include the shipment of the plates shown in Figure 4, at which time they have the strength gained from their double thickness to protect the product from damage. The carbon plate 11 is of such thickness as to give the desired strength to the battery plates 2. The zinc layers 12 are affixed to both sides of the carbon plate 11 by electroplating, rolling or any suitable method which provides a good physical and electrical contact. The carbon plate is then split on a plane through its center, indicated on the drawing by dot and dash lines, by sawing or other suitable means and the resulting zinc and carbon plates cut to the desired size for the battery plates. The foregoing method results in advantages not before realized in the manufacture of duplex battery plates. This is due to application of the zinc coating to both sides of the carbon plate in a single operation resulting in a saving in both time and labor. For example, instead of electroplating a single side of a carbon plate, which involves the problem of preventing a deposit on the opposite side of the plate, both sides are simultaneously electro-plated and subsequently split. The result is the production of two duplex plates with substantially the same amount of time and labor formerly necessary to produce one plate. Such a plate cut to size ready to be inserted into the container is illustrated in Fig. 5.

It can readily be seen that by using small battery plates which are easily manufactured in the above manner, a dry cell of high voltage and small dimensions may be obtained. For example, if each plate is made $\frac{1}{16}$ inch thick by $\frac{1}{8}$ inch wide, about 144 volts may be obtained from a battery 1¼ inches square, by using 12 rows of cells serially connected, each row containing 8 cells. The depth of the battery may be made 1 inch or more, depending upon the current capacity needed.

The above description of the invention is subject to modifications well known to those skilled in the art. Therefore, the invention is not limited thereby but only by the appended claims.

I claim:
1. The method of manufacturing plates for a primary battery comprising the steps of depositing a layer of zinc on two opposite faces of a carbon plate, and splitting said carbon plate on a plane parallel to said layers of zinc.

2. The method of manufacturing a plate for a primary battery comprising the steps of depositing a layer of zinc on two opposite faces of a carbon plate, dividing the carbon plate on a plane parallel to and intermediate said zinc layers, and cutting said divided carbon plates to the required size for said battery.

3. The method of manufacturing a plate for a primary battery comprising the steps of bonding together two flat pieces of carbon to form a carbon plate, depositing a layer of zinc on two opposite faces of said carbon plate, and breaking the bond between said pieces of carbon.

DOUGLAS B. CRUIKSHANK.

REFERENCES CITED

The following references are of record in the file of this patent:

UNITED STATES PATENTS

| Number | Name | Date |
|---|---|---|
| 1,314,603 | Mott | Sept. 2, 1919 |
| 1,594,810 | Benner | Aug. 3, 1926 |
| 1,631,568 | Yngve | June 7, 1927 |
| 1,855,677 | Huntley | Apr. 26, 1932 |
| 2,144,574 | MacCallum | Jan. 17, 1939 |
| 2,154,312 | MacCallum | Apr. 11, 1939 |
| 2,428,850 | Lawson | Oct. 14, 1947 |
| 2,519,054 | Woodring | Aug. 15, 1950 |

FOREIGN PATENTS

| Number | Country | Date |
|---|---|---|
| 107,316 | France | Mar. 20, 1875 |
| 15,799 | Great Britain | Sept. 2, 1892 |
| 604,474 | France | May 5, 1926 |
| 503,875 | Great Britain | Apr. 17, 1939 |